(12) United States Patent
Suita et al.

(10) Patent No.: US 7,798,091 B2
(45) Date of Patent: Sep. 21, 2010

(54) METER DEVICE AND VEHICLE

(75) Inventors: Yoshikazu Suita, Samutprakarn (TH);
Pairuch Worakasemsuk, Samutprakarn (TH)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 203 days.

(21) Appl. No.: 11/860,429

(22) Filed: Sep. 24, 2007

(65) Prior Publication Data

US 2008/0236474 A1    Oct. 2, 2008

(30) Foreign Application Priority Data

Sep. 29, 2006    (JP)    ............... 2006-270001

(51) Int. Cl.
*G01D 11/28*    (2006.01)
(52) U.S. Cl. .............. 116/287; 116/62.1; 116/334; 116/DIG. 5; 362/26; 362/30; 362/489
(58) Field of Classification Search ............ 116/284, 116/286–289, 298, 300, 302, 303, 305, 327, 116/328, 332, 334, 335, 62.1, 62.3, 62.4, 116/DIG. 5, DIG. 6, DIG. 35, DIG. 36; 362/23, 362/26–30, 471, 489
See application file for complete search history.

(56) References Cited

U.S. PATENT DOCUMENTS

| | | | | |
|---|---|---|---|---|
| 2,837,053 A * | 6/1958 | Viret | ............ | 116/287 |
| 3,699,915 A * | 10/1972 | Greene | ............ | 362/26 |
| 4,233,927 A * | 11/1980 | Oikawa et al. | ............ | 116/287 |
| 5,652,508 A * | 7/1997 | Yamamoto | ............ | 324/166 |
| 6,302,551 B1 * | 10/2001 | Matumoto | ............ | 362/27 |
| 6,318,872 B1 * | 11/2001 | Kato et al. | ............ | 362/26 |
| 6,409,355 B1 * | 6/2002 | Simon et al. | ............ | 362/23 |
| 6,585,385 B2 * | 7/2003 | Nakagawa et al. | ............ | 362/23 |
| 6,802,276 B2 * | 10/2004 | Sugimoto | ............ | 116/62.1 |
| 7,093,948 B2 * | 8/2006 | Fong et al. | ............ | 362/30 |
| 7,207,117 B1 * | 4/2007 | Cook et al. | ............ | 116/286 |
| 7,537,363 B2 * | 5/2009 | Kato | ............ | 362/489 |

FOREIGN PATENT DOCUMENTS

| | | |
|---|---|---|
| EP | 0 732 679 A1 | 9/1996 |
| EP | 1 340 673 A2 | 9/2003 |
| JP | 10048004 A * | 2/1998 |
| JP | 2002071392 A * | 3/2002 |
| JP | 2004-340871 | 12/2004 |
| WO | 2006/027134 A1 | 3/2006 |

OTHER PUBLICATIONS

Official Communication issued in corresponding European Patent Application No. 07253680, completed on Jan. 15, 2010.

* cited by examiner

*Primary Examiner*—Amy Cohen Johnson
(74) *Attorney, Agent, or Firm*—Keating & Bennett, LLP (57) ABSTRACT

A meter device for a vehicle with enhanced visibility that is easily discriminated from other meter devices. A speedometer includes a meter panel having an indication surface that indicates a running speed, and a finger moving in an area above the meter panel. A light guide surrounds a rim part of the meter panel. The light guide is formed with a light guiding member which guides light from a light source. A rim frame section of the light guide protrudes over the indication surface from a back side of the meter panel toward a front side.

10 Claims, 12 Drawing Sheets

METER DEVICE AND VEHICLE

RELATED APPLICATIONS

This application claims the benefit of priority under 35 USC 119 of Japanese patent application nos. 2006-270001, filed on Sep. 29, 2006, which application is hereby incorporated by reference in its entirety.

BACKGROUND OF THE INVENTION

1. Field of the Invention

The present invention relates to a meter device for a vehicle including an indication plate having an indication surface which indicates information concerning a measured amount, and a finger moving in an area above the indication plate.

2. Description of Related Art

Conventionally, vehicles such as motorcycles have a meter device indicative of a measured amount, such as a speedometer indicative of a running speed. A rim part of an analog indication type meter device, i.e. a meter device that indicates a measured amount by a finger moving in an area above a meter panel which indicates information concerning the measured amount (for example, running speed), is typically illuminated to enhance visibility of the meter device.

For example, visibility of one known meter device, and ease of discrimination from other meter devices, is enhanced by providing a light guiding plate which guides light from a light source in a rim part of the meter panel (see JP-A-2004-340871 (pages 4 and 5, FIG. 2)).

It would be advantageous to further enhance visibility, specifically, to enhance the ease of discrimination from other meter devices or the like.

SUMMARY OF THE INVENTION

The present invention is made under these circumstances and provides a meter device for a vehicle with enhanced visibility and that can be easily discriminated from other meter devices or the like.

A first feature of the present invention is a meter device including an indication plate having an indication surface that indicates information concerning a measured amount (for example, a running speed), a finger that moves in an area above the indication plate and a light source. An indication plate frame surrounds at least a portion of a rim part of the indication plate. The indication plate frame is formed from a light guiding member (which, for example, may be made of acrylic resin) that guides light from the light source. The indication plate frame protrudes over the indication surface from a back side of the indication plate toward a front side thereof.

According to the meter device described above, the indication plate frame surrounding at least the portion of the rim part of the indication plate and formed from the light guiding member protrudes over the indication surface from the back side of the indication plate toward the front side thereof.

By illuminating the indication plate frame protruding over the indication surface from the back side of the indication plate toward the front side thereof, the meter device is more solidly visible.

A second feature of the invention is that the indication plate frame has a projecting scale section projecting toward the front side of the indication plate. The projecting scale section is formed at a specific position corresponding to a measured amount (for example, positions of 0 km/h and 180 km/h).

A third feature of the invention is that the projecting scale section projects from the rim part to an inner side in the area above the indication plate.

A fourth feature of the invention is that the indication plate frame has a plurality of projecting scale sections. A size of the projecting scale section that is formed at a position corresponding to a reference value (0 km/h) of the measured amount is greater than respective sizes of the remaining projecting scale sections.

A fifth feature of the invention is that the indication plate frame has a frame inner end formed in the rim part side, a frame outer end formed out of the frame inner end, and a frame inclination section formed between the frame inner end and the frame outer end.

A sixth feature of the invention is that the frame outer end is positioned more forward than the frame inner end on the front side of the indication plate.

A seventh feature of the invention is that each projecting scale section has a scale section inner end formed in the rim part side, a scale section outer end formed out of the scale section inner end, and a scale section inclination part formed between the scale section inner end and the scale section outer end.

An eighth feature of the invention is that the scale section outer end is positioned more forward than the scale section inner end on the front side of the indication plate.

A ninth feature of the invention is that the finger is formed from a light guiding member to guide light from the light source or another light source.

A tenth feature of the invention is an outer frame surrounding at least a portion of the indication plate frame outside. The outer frame is treated (for example, plated) to reflect light.

An eleventh feature of the invention is that the meter device is juxtaposed with another meter device, and only the meter device has the indication plate frame.

A twelfth feature of the invention is a vehicle including the meter device.

According to the present invention, a meter device for a vehicle with enhanced visibility and ease of discrimination from other meter devices or the like is provided.

Other features and advantages of the invention will be apparent from the following detailed description, taken in conjunction with the accompanying drawings which illustrate, by way of example, various features of embodiments of the invention.

DETAILED DESCRIPTION OF THE INVENTION (Structure of Vehicle of a Present Embodiment)

Next, with reference to drawings, an embodiment of a vehicle according to the present invention is described. In the descriptions of the drawings, the same or similar portions are assigned with the same or similar reference numerals and symbols. However, it should be noted that the drawings are schematic and that, for example, ratios between respective dimensions are different from actual ones.

Accordingly, specific dimensions or the like should be determined in consideration of the following description. It is also noted that mutual dimensional relationships or ratios can be different from each other between the respective drawings.

(1) Overall Structure

Figure 1:
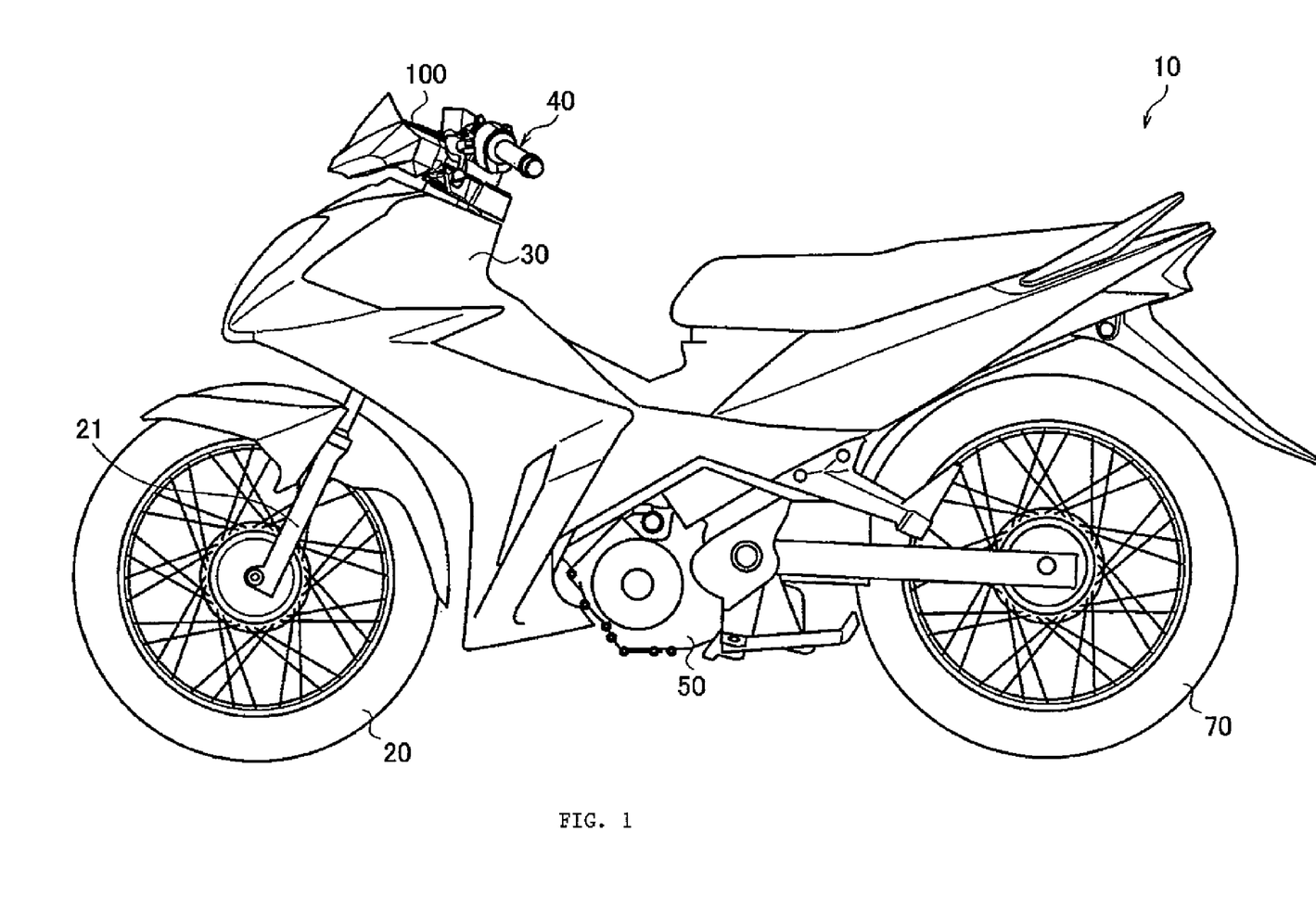
FIG. 1 is a left side view of a vehicle according to an embodiment of the present invention.

FIG. 1 is a left side elevational view of a motorcycle 10. Motorcycle 10 is a so-called under-bone type motorcycle that has a body frame positioned lower in comparison with a general straddle type motorcycle.

Motorcycle 10 has a front wheel 20 and a rear wheel 70. Rear wheel 70 is driven by power generated by an engine 50.

Motorcycle 10 has a right and left pair of front forks 21 supporting front wheel 20 for rotation. Specifically, front forks 21 allow front wheel 20 to move (linear motion) in a vertical direction (a direction in which a certain caster angle is given) in accordance with variations of road conditions to absorb shocks that front wheel 20 receives.

Figure 2:
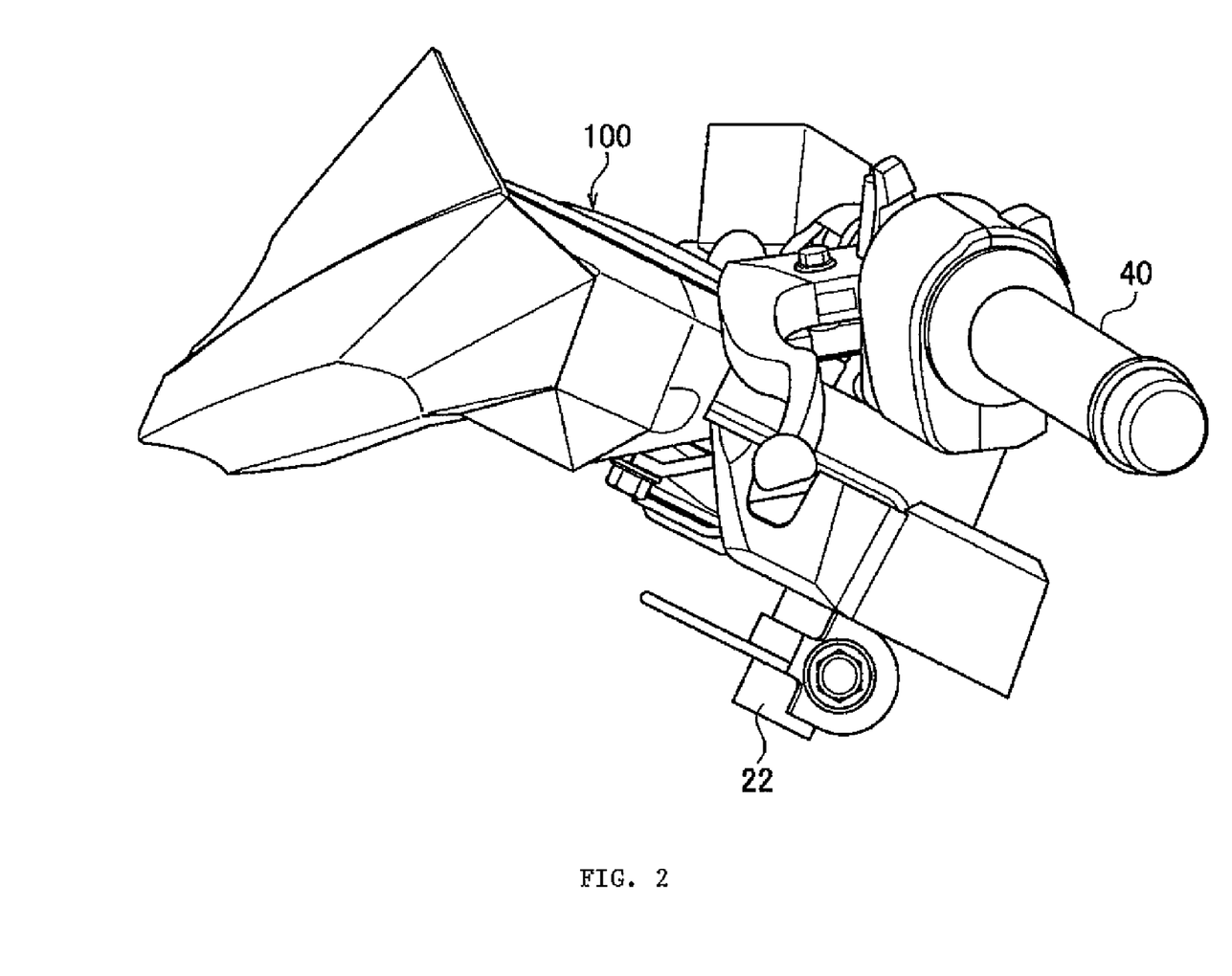
FIG. 2 is a partial, enlarged, side view of a combination meter unit according to the embodiment of the present invention and its vicinity.

Motorcycle 10 has a front cowling 30 for covering a portion of front forks 21 and a steering shaft 22 (see FIG. 2). A handle bar unit 40 operated by a rider to change a direction of front wheel 20 and a combination meter unit 100 are disposed above front cowling 30.

(2) Structure of Meter Device

Next, a structure of a meter device according to this embodiment will be described. Specifically, a structure of combination meter unit 100 and a minute structure of a speedometer 120 (see FIG. 3) constructing the meter device will be described.

(2.1) Structure of Combination Meter Unit

Figure 3:
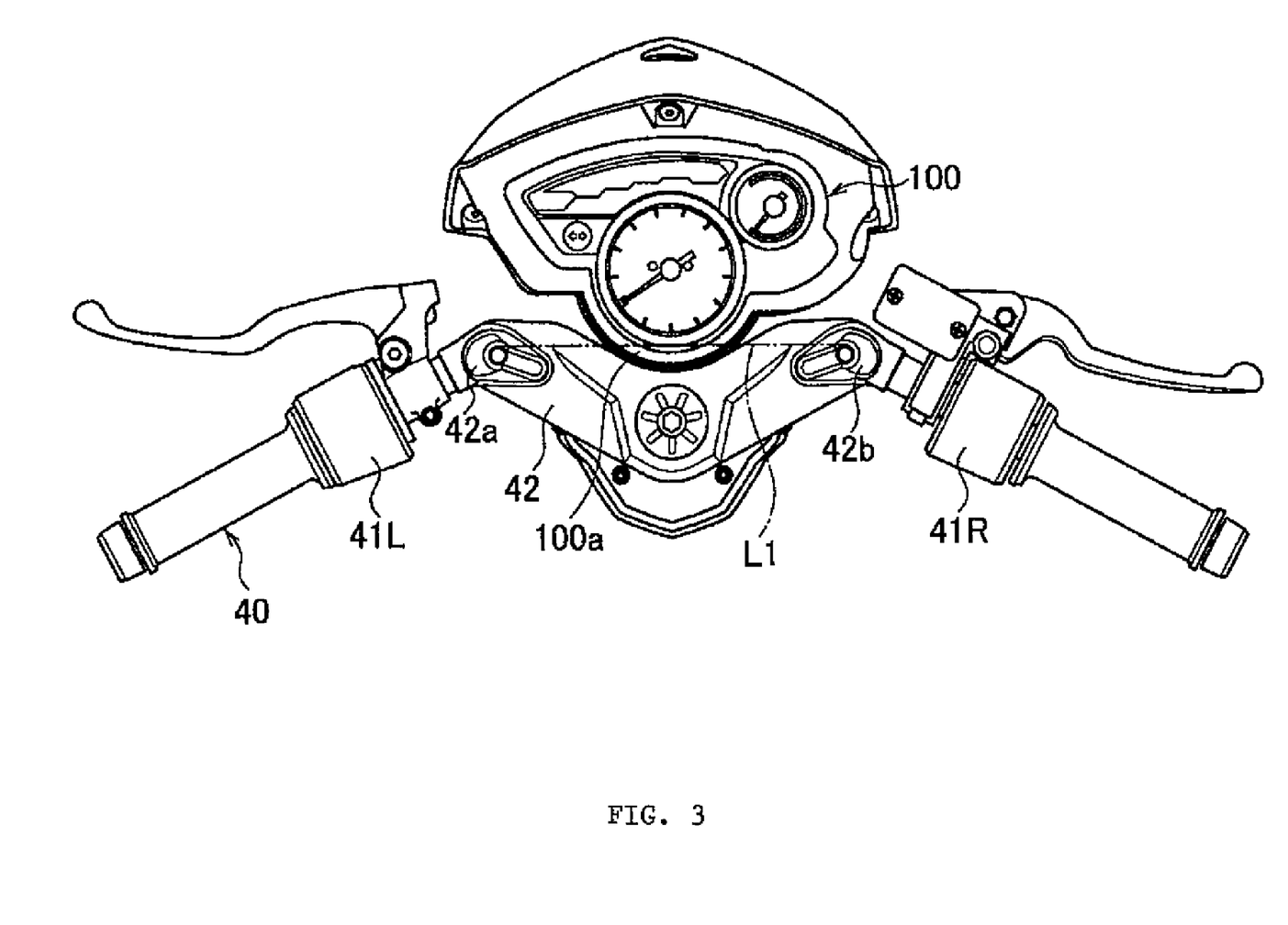
FIG. 3 is a plan view of the combination meter unit according to the embodiment of the present invention and its vicinity.

FIG. 2 is a partial, enlarged, side elevational view of combination meter unit 100 and its vicinity. FIG. 3 is a plan view of combination meter unit 100 and its vicinity.

Combination meter unit 100 is disposed in front of handle bar unit 40 and is fixed to steering shaft 22 coupled with front forks 21 (see FIG. 1).

Handle bar unit 40 has a left side handle bar 41L, a right side handle bar 41R and a handle crown 42 coupled with steering shaft 22. Handle bars 41L and 41R are also coupled with handle crown 42. Specifically, left side handle bar 41L is coupled with a left side handle bar coupling section 42a, and right side handle bar 41R is coupled with a right side handle bar coupling section 42b.

Handle crown 42 curves along a bottom end portion 100a of combination meter unit 100. Therefore, bottom end portion 100a extends into an area of handle crown 42 beyond a line L1 passing through left and right side handle bar coupling sections 42a and 42b.

Figure 4:
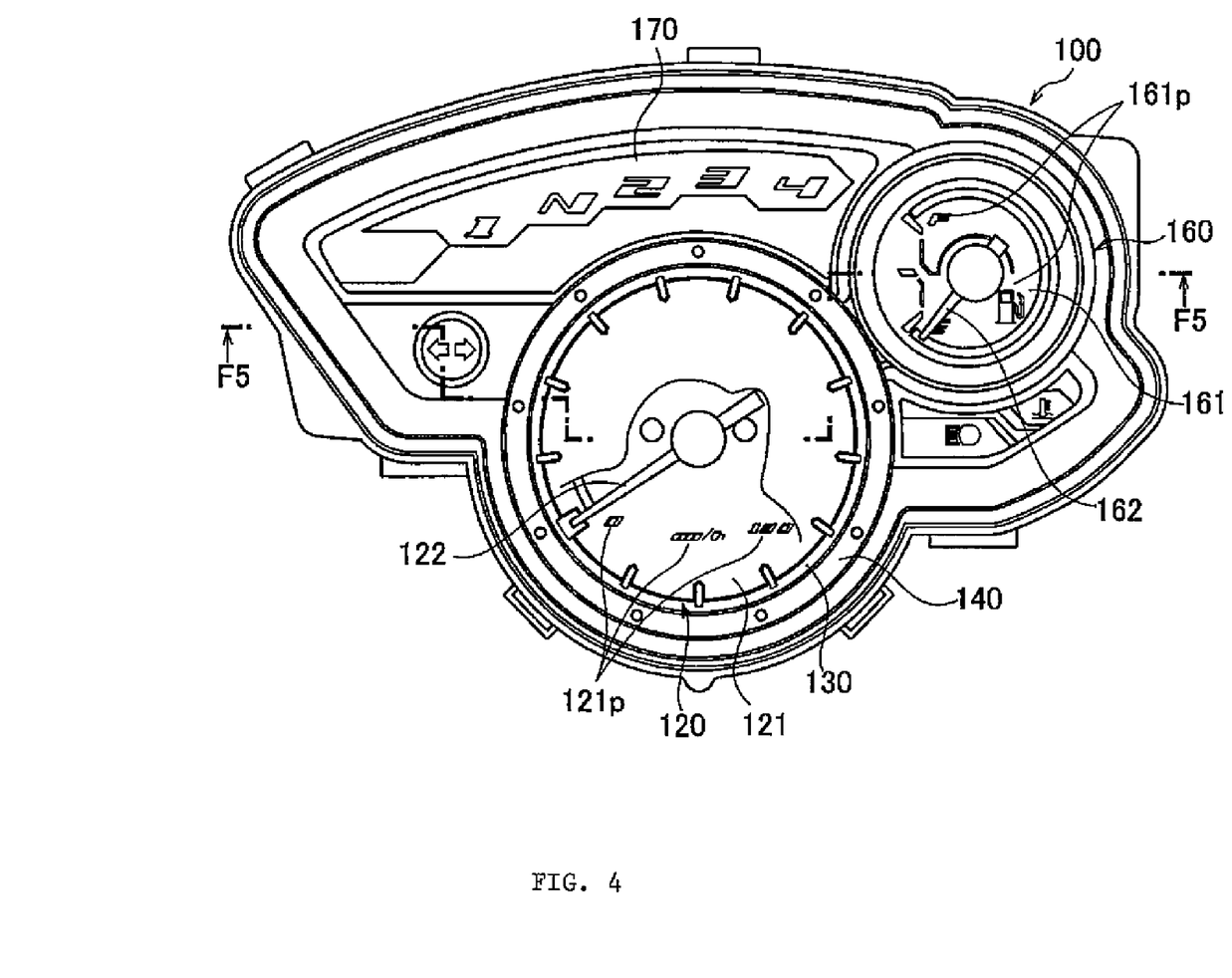
FIG. 4 is a plan view of the combination meter unit according to the embodiment of the present invention.

FIG. 4 is a plan view of combination meter unit 100. As shown in FIG. 4, combination meter unit 100 includes a speedometer 120, a fuel meter 160 and a shift indicator 170.

Speedometer 120 is an analog indication type speedometer and includes a meter panel 121 (indication plate) and a finger 122. Finger 122 moves in an area above meter panel 121 to point at a running speed of motorcycle 10. Finger 122 is formed from a light guiding member which guides light of a light source, specifically, the light of finger lighting lamp 152 (see FIG. 7). In one embodiment, finger 122 is made from acrylic resin.

Meter panel 121 has a permeable part 121p (printed with alphanumeric characters such as, for example, "0," "180" and "km/h") which allows light from a light source, specifically, from meter lamp 151 (see FIG. 5) to pass therethrough. Permeable part 121p is printed with light-permeable ink. Alternatively, non-light-permeable ink may be applied to meter panel 121 and then removed in correspondence with certain alphanumeric characters to obtain permeable part 121p.

A light guide 130 (indication plate frame) is placed out of meter panel 121. Light guide 130 is formed from a light guiding member to guide light from meter lamp 151 (see FIG. 5). In one embodiment, light guide 130 is made from acrylic resin. Also, in one embodiment, light guide 130 is colored tangerine.

A reflector ring 140 (outer frame) is placed outside of light guide 130 and surrounds light guide 130. Reflector ring 140 is treated (specifically, plated) to reflect light.

Fuel meter 160 (one of other meters) has a meter panel 161 and a finger 162 to indicate an amount of fuel in a fuel tank of motorcycle 10. Meter panel 161, similarly to meter panel 121, has a permeable part 161p (for example, printed with "F," an icon for fuel) which allows light to pass therethrough.

Fuel meter 160 is adjacent to and to the diagonally upper right of speedometer 120. Fuel meter 160 is smaller in size than speedometer 120.

A light guiding member such as light guide 130 is not placed outside of fuel meter 160. That is, only speedometer 120 has light guide 130 that guides light from the light source.

Shift indicator 170 indicates a selected transmission gear or neutral position.

Figure 5:
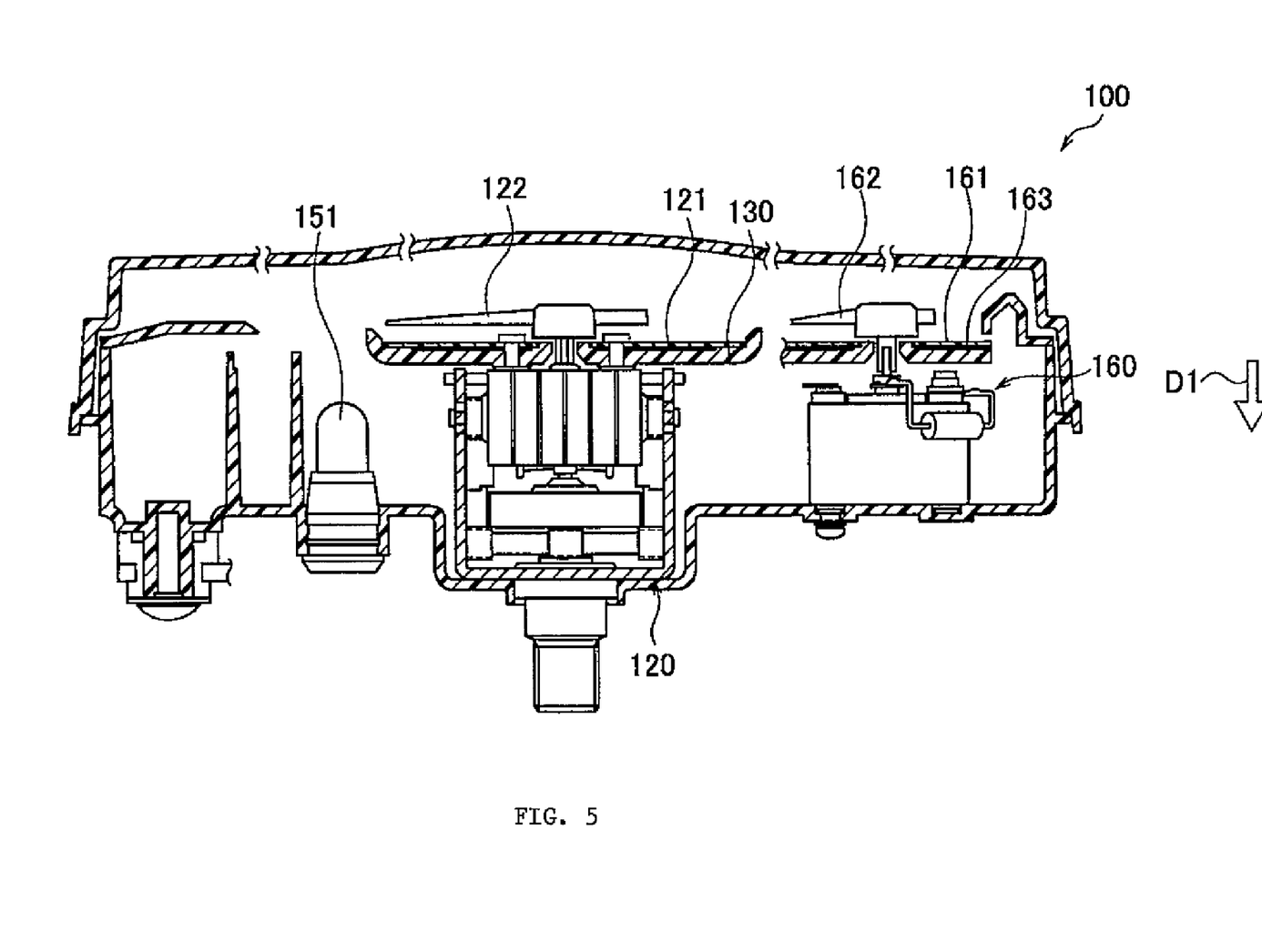
FIG. 5 is a cross sectional view of the combination meter unit, taken along line F5-F5 of FIG. 4.

FIG. 5 is a cross sectional view of combination meter unit 100, taken along line F5-F5 of FIG. 4. As shown in FIG. 5, speedometer 120 has meter panel 121 and finger 122. Light guide 130 is placed under meter panel 121.

Light guide 130 guides light from meter lamp 151. The guided light shines on or illuminates the vicinity of rim part 121d and permeable part 121p of meter panel 121.

In the cross section taken along line F5-F5, fuel meter 160 is juxtaposed with speedometer 120. That is, finger 122 and finger 162 are generally positioned at the same level in a depth (D1) direction. Also, a light guide 163 for guiding light to permeable part 161p (see FIG. 4) from a lamp is placed under meter panel 161.

Light guide 163 is positioned just under meter panel 161. Unlike light guide 130, light guide 163 does not extend outside of meter panel 121.

(2.2) Detailed Structure of Meter Device

Next, a detailed structure of the meter device according to this embodiment, i.e., speedometer 120 is described.

(2.2.1) Configurations of Indication Plate and Indication Plate Frame

Figure 6:
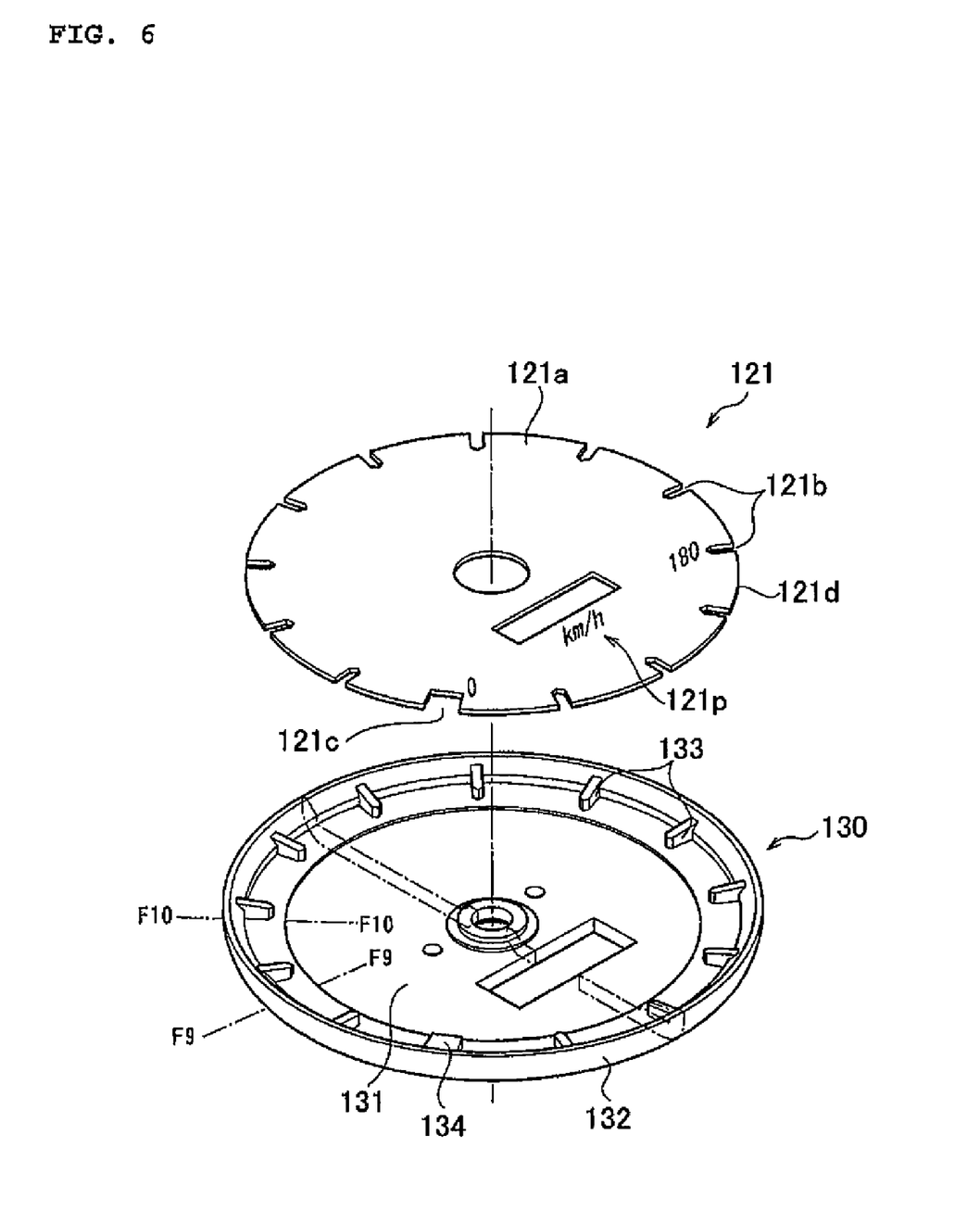
FIG. 6 is an exploded perspective view of an indication plate and an indication plate frame according to the embodiment of the present invention.

FIG. 6 is an exploded perspective view of meter panel 121 that forms the indication plate in this embodiment and of light guide 130 that forms the indication plate frame in this embodiment.

As shown in FIG. 6, meter panel 121 has an indication surface 121a for indicating a running speed or the like. Specifically, permeable part 121p has alphanumeric characters ("0," "180" etc.) indicating the running speed or the like. Only some such alphanumeric characters are shown in FIG. 6.

Meter panel 121 has notches 121b and a notch 121c engaging with scale projections 133 and a reference scale projection 134, respectively, which are formed on light guide 130.

Light guide 130 is disposed under meter panel 121 and surrounds rim part 121d of meter panel 121.

Light guide 130 has a generally disk-shaped bottom plate section 131 and a rim frame section 132 extending from the rim of bottom plate section 131 toward meter panel 121 so as to surround meter panel 121.

Also, light guide 130 has scale projections 133 projecting inward from rim part 121d of meter panel 121 in an area above meter panel 121 and reference scale projection 134. In this embodiment, scale projections 133 and reference scale projection 134 form projecting scale sections. Scale projections 133 and reference scale projection 134 project toward the front side of meter panel 121.

Scale projections 133 are formed at specific positions corresponding to running speeds (20 km/h, 40 km/h etc.). Reference scale projection 134 is formed at a position where finger 122 points when a reference running speed is given, specifically, when the running speed of motorcycle 10 is 0 km/h.

Thus, light guide 130 has a plurality of scale projections 133. A reference value of the measured amount, specifically, a width of reference scale projection 134 formed at the location corresponding to the reference running speed (0 km/h) is longer than a width of each scale projection 133.

(2.2.2) Finger Shining Function

Figure 7:
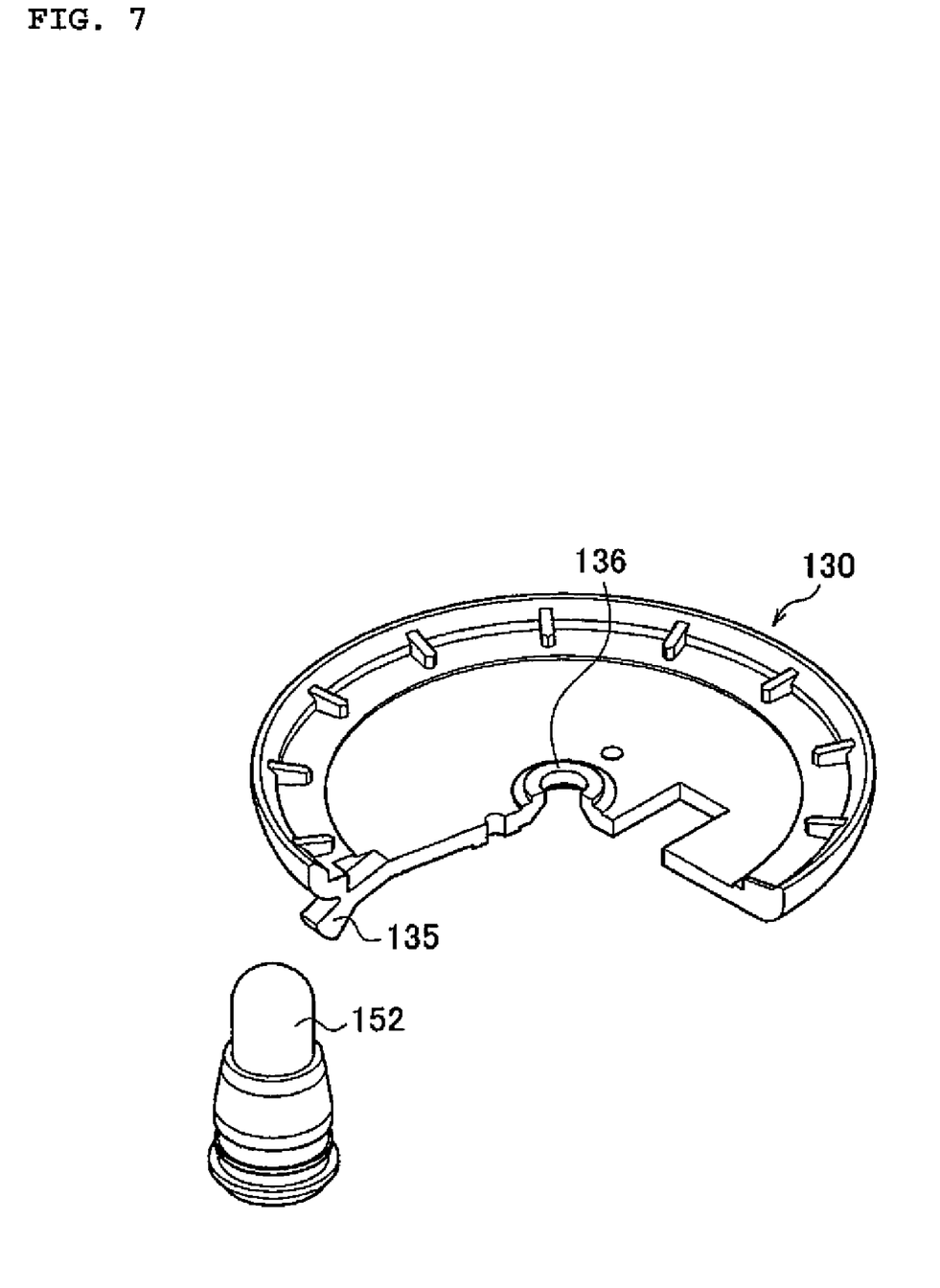
FIG. 7 is a partially sectioned perspective view of the indication plate frame according to the embodiment of the present invention.

FIG. 7 is a partially sectioned perspective view of light guide 130. Light guide 130 is also used for guiding light to finger 122 from the light source. As shown in FIG. 7, a light introducing section 135 and a light emitting section 136 are defined in light guide 130.

Light introducing section 135 introduces light from finger lighting lamp 152, which is guided to light emitting section 136. Light emitting section 136 emits light from finger lighting lamp 152.

Figure 8:
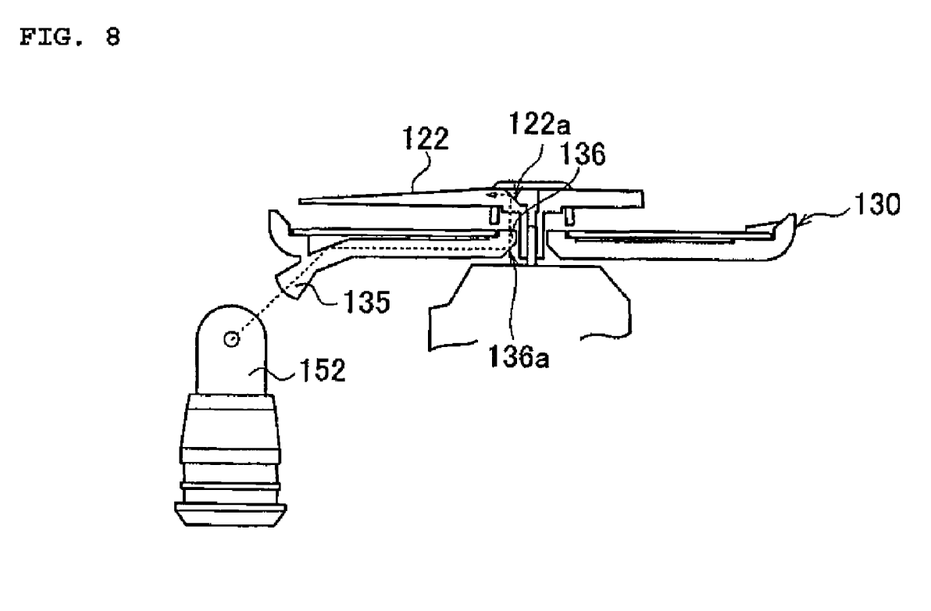
FIG. 8 is an explanatory view for showing how light from a light source according to the embodiment of the present invention illuminates a finger.

FIG. 8 is an explanatory view showing how light emitted from finger lighting lamp 152 shines on or illuminates finger 122. For simplicity, cross-sectional hatching is omitted in FIG. 8. As shown in FIG. 8, an inclination part 136a is formed in light emitting section 136 and reflects light (indicated by the dotted line) from finger lighting lamp 152 upward, i.e., toward finger 122.

Also, an inclination part 122a which reflects light from finger lighting lamp 152 toward a tip end of finger 122 is formed in finger 122.

(2.2.3) Detailed Configuration of Rim Frame Section

Figure 9:
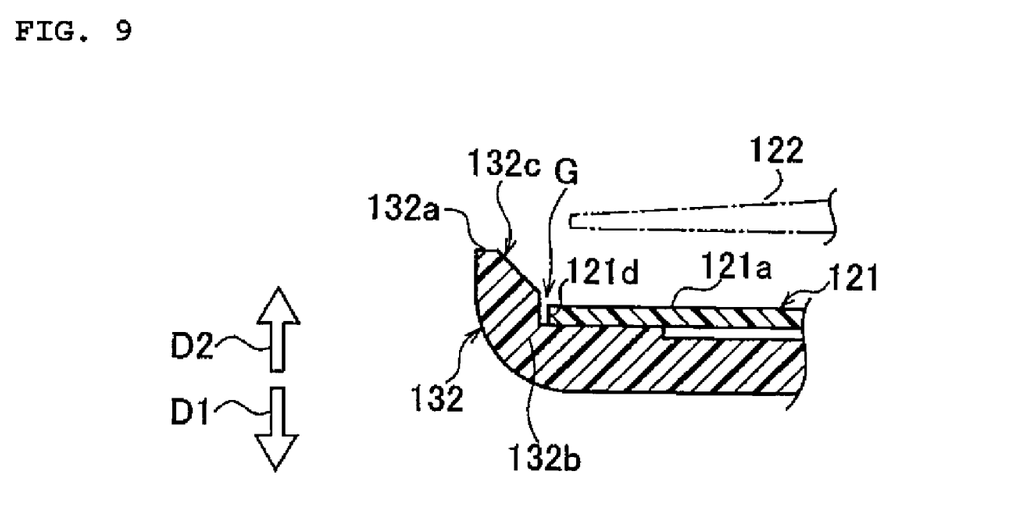
FIG. 9 is a cross sectional view of the indication plate frame, taken along line F9-F9 of FIG. 6.

Next, a detailed configuration of rim frame section 132 of light guide 130 will be described. FIG. 9 is a cross sectional view of light guide 130, taken along line F9-F9 of FIG. 6.

As shown in FIG. 9, light guide 130, specifically, rim frame section 132 protrudes over an indication surface 121a from the back side (D1 direction side in the figure) of meter panel 121 toward the front side (D2 direction side in the figure) thereof.

Also, rim frame section 132 has an outer end 132a (frame outer end), an inner end 132b (frame inner end) and an inclination section 132c (frame inclination section).

Inner end 132b is formed on the rim part 121d side of meter panel 121. Outer end 132a is formed out of inner end 132b. Outer end 132a is positioned more forward of or higher than inner end 132b on the front side. Inclination section 132c is formed between inner end 132b and outer end 132a. That is, rim frame section 132 has a mortar shape that descends from outer end 132a toward inner end 132b.

Figure 10:
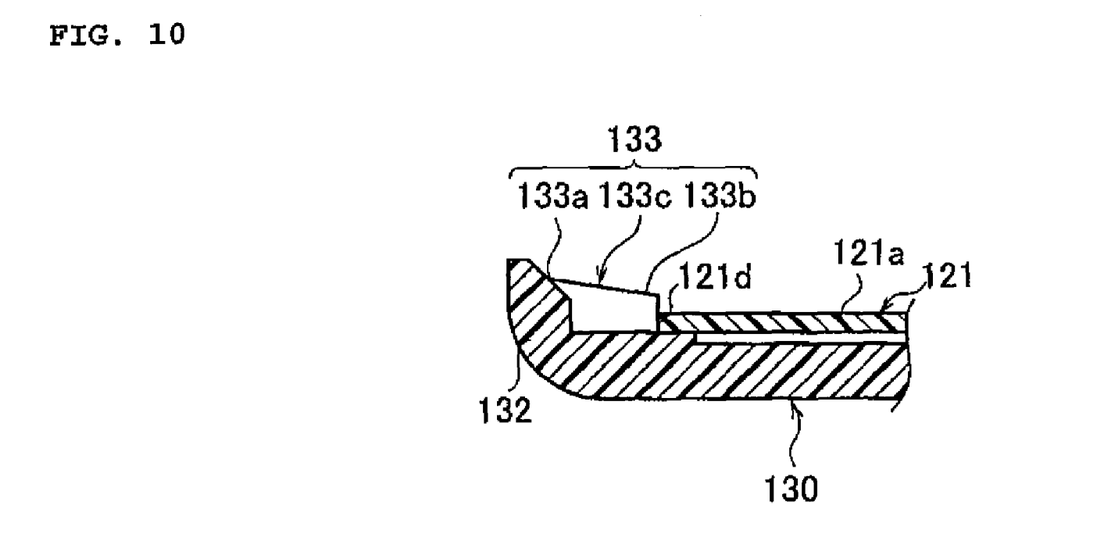
FIG. 10 is a cross sectional view of the light guide, taken along line F10-F10 of FIG. 6.

FIG. 10 is a cross sectional view of light guide 130 taken along line F10-F10 of FIG. 6. As shown in FIG. 10, each scale projection 133 has an outer end 133a (scale section outer end), an inner end 133b (scale section inner end) and an inclination part 133c (scale section inclination part).

Inner end 133b is formed on the rim part 121d side of meter panel 121. Outer end 133a is formed out of inner end 133b. Outer end 133a is positioned more forward of or higher than inner end 133b on the front side. Inclination part 133c is formed between inner end 133b and outer end 133a. That is, each scale projection 133 has a shape that descends from outer end 133a toward inner end 133b.

Additionally, although not shown, reference scale projection 134 has a lateral shape similar to that of scale projection 133.

(Action and Effect)

According to combination meter unit 100, specifically speedometer 120, light guide 130 surrounding rim part 121d of meter panel 121 and made from acrylic resin protrudes over indication surface 121a of meter panel 121 from the back side of meter panel 121 toward the front side thereof.

Because meter lamp 151 illuminates light guide 130 that protrudes over indication surface 121a from the back side of meter panel 121 toward the front side thereof, speedometer 120 is more solidly visible. That is, the visibility of speedometer 120 and the ease by which it can be discriminated from fuel meter 160 and shift indicator 170 is further enhanced.

Also, because light guide 130 protrudes over indication surface 121a of light guide 130, speedometer 120 is more solidly visible even though meter lamp 151 does not shine the light guide.

In this embodiment, light guide 130 has scale projections 133 and reference scale projection 134 which project inward of meter panel 121 from rim part 121d of meter panel 121. Because meter lamp 151 illuminates scale projections 133 and reference scale projection 134, the visibility of speedometer 120, specifically, the situation in which finger 122 points at a specific running speed (20 km/h, 40 km/h etc.) can be easily seen by the rider.

Further, the width of reference scale projection 134 formed at the location of "0 km/h" is larger than the width of each scale projection 133. Therefore, the rider can easily recognize the reference position of finger 122.

In this embodiment, rim frame section 132 has inclination section 132c that descends from outer end 132a toward inner end 132b. That is, rim frame section 132 has a mortar shape. Therefore, light is scattered toward the front side in inclination section 132c. Speedometer 120 thus is more solidly visible.

Also, because rim frame section 132 has a mortar shape, a gap G between meter panel 121 and rim frame section 132 can be inconspicuous, as shown in FIG. 9. Further, because rim frame section 132 has a mortar shape, meter panel 121 having notches 121b, 121c and light guide 130 having scale projections 133 and reference scale projection 134 can be easily assembled with each other.

Each scale projection 133 (including reference scale projection 134) has inclination part 133c that descends from outer end 133a toward inner end 133b. Therefore, light is scattered toward the front side in inclination part 133c. Speedometer 120 thus is more solidly visible.

In this embodiment, finger 122 is also formed from the light guiding member, specifically, made from acrylic resin. Also, because plated reflector ring 140 surrounds light guide 130 externally in this embodiment, a wide area including the outside of light guide 130 surrounding meter panel 121 is illuminated. Thus, the visibility of speedometer 120 is further enhanced.

Other Embodiments

Although an embodiment of the invention has been described, the descriptions and drawings forming a portion of this disclosure do not limit the invention. Various alternative embodiments will be apparent to one of skill in the art from this disclosure.

Figure 11:
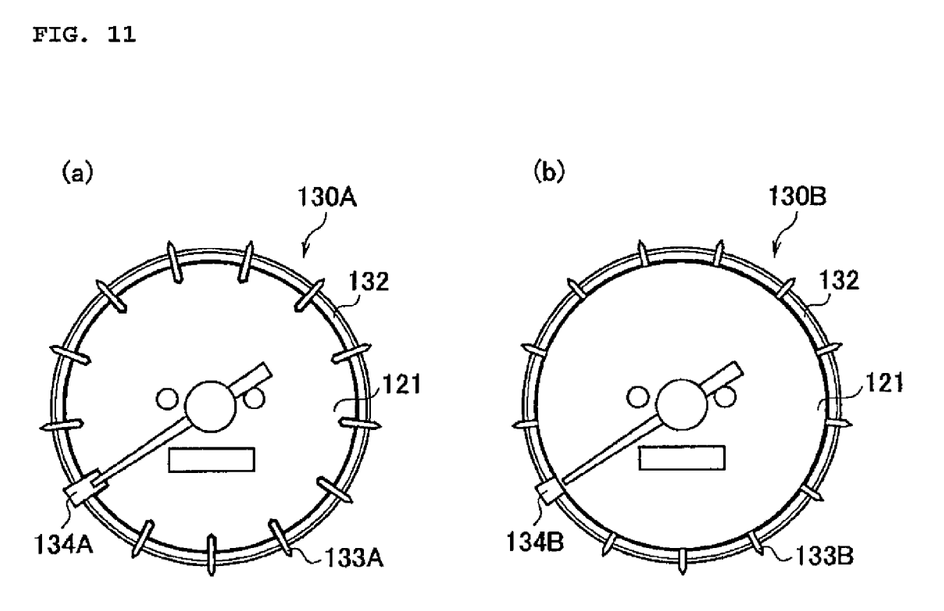
FIG. 11 is a plan view of an indication plate frame according to a variation of the present invention.
Figure 12:
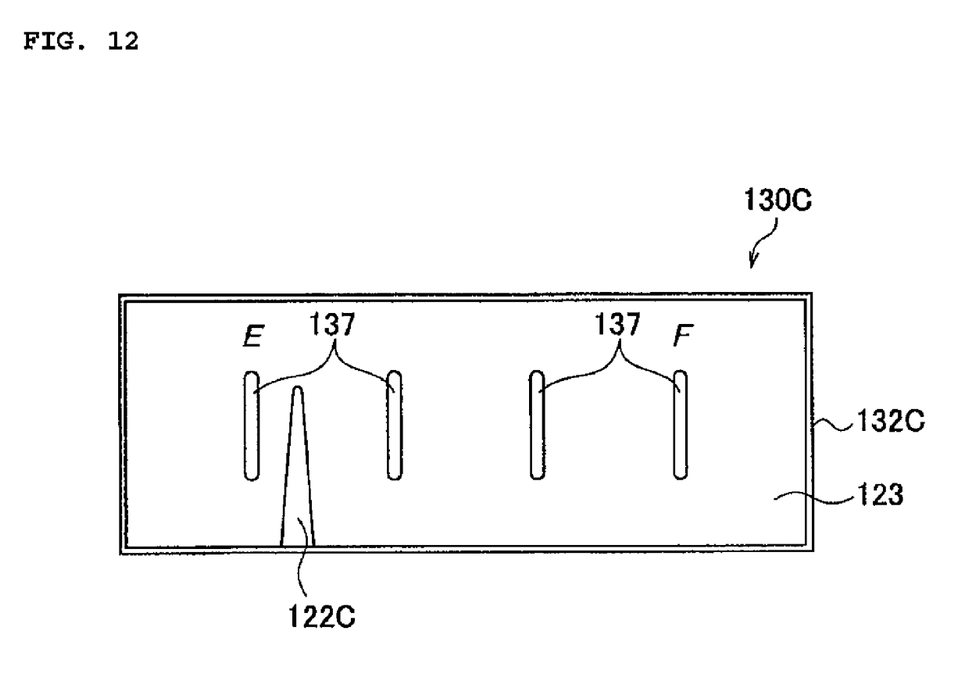
FIG. 12 is a plan view of an indication plate frame according to a variation of the present invention.

For example, the configuration of light guide 130 can be changed to those shown in FIGS. 11(a) and (b) and FIG. 12. A light guide 130A shown in FIG. 11(a) and a light guide 130B shown in FIG. 11(b) have different rim frame sections.

Light guide 130A shown in FIG. 11(a) has scale sections 133A and a reference scale section 134A each extending outward and inward from a rim frame section 132. Light guide 130B shown in FIG. 11(b) has scale projections 133B and a reference scale projection 134B each extending outward from a rim frame section 132. Scale sections 133A, scale projections 133B, reference scale section 134A and reference scale projection 134B project toward the front side of meter panel 121.

FIG. 12 shows another variation of light guide 130. A light guide 130C shown in FIG. 12 is not circularly shaped but has a rectangular shape. A finger 122C does not rotate as finger 122 but moves parallel in a longitudinal direction of meter panel 123.

Light guide 130C has an outer frame section 132C. Also, light guide 130C has a plurality of scale sections 137. Scale sections 137 do not contact with outer frame section 132C and are formed at certain positions corresponding to indication amounts (for example, fuel). Scale sections 137 project toward the front side of meter panel 121.

Finger 122 and light guide 130 are described herein as made from acrylic resin, but may alternatively be made from materials other than acrylic resin, for example, polycarbonate resin, ABS resin, polyethylene terephthalate (PET) or glass. That is, the materials used for making finger 122 or light guide 130 are only required to be light-permeable and have refraction rate higher than that of air.

Although finger 122 is formed from the light guiding member in the embodiment described above, the finger is not necessarily formed from the light guiding member.

In the embodiment described above, light guide 130 (rim frame section 132) and reflector ring 140 are placed over the whole region of rim part 121d of meter panel 121. However, light guide 130 (rim frame section 132) and reflector ring 140 are not necessarily placed all over the whole region of rim part 121d of meter panel 121. Also, reflector ring 140 is not necessarily provided.

In the embodiment described above, inclination section 132c whose outer end 132a is positioned more forward or higher than inner end 132b on the front side, and inclination section 133c whose outer end 133a is positioned more forward or higher than inner end 133b on the front side, are formed. However, inner end 132b or inner end 133b can be positioned more forward on the front side. Also, inclination section 132c, inclination section 133c, scale projections 133 or reference scale projection 134 are not necessarily formed.

Further, in the embodiment described above, the width of reference scale projection 134 is greater than the width of each scale projection 133. However, the length of reference scale projection 134 can be more or less than the length of scale projection 133. Likewise, the height of reference scale projection 134 can be higher or lower than the height of scale projection 133.

Although motorcycle 10 is described as an example in the embodiment described above, the present invention can be applied to vehicles other than motorcycles, for example, vehicles such as automobiles or the like having a meter device.

The scope of the present invention includes various other embodiments that are not specifically described herein. Accordingly, the scope of the invention can be determined only with reference to the following claims.

The invention claimed is:

1. A meter device comprising:
an indication plate including a rim part and an indication surface that indicates information concerning a measured amount;
a finger arranged to move in an area above the indication plate;
a light source; and
an indication plate frame that surrounds at least a portion of the rim part of the indication plate, wherein
the indication plate frame is made of a light guiding material and arranged to guide light from the light source to the indication plate,
the indication plate frame includes a protruding portion arranged to protrude beyond the indication surface from a back side of the indication plate to a front side of the indication plate,
the protruding portion of the indication plate frame illuminates the indication surface of the indication plate with the light from the light source, and
the protruding portion includes a frame inclination section arranged such that a frame outer end of the frame inclination section is positioned more forward on the front side of the indication plate than a frame inner end arranged adjacent to the rim part of the indication plate.

2. The meter device according to claim 1, wherein
the indication plate frame includes a projecting scale section projecting toward the front side of the indication plate,
and the projecting scale section is arranged at a specific position corresponding to the measured amount.

3. The meter device according to claim 2, wherein the projecting scale section projects inward from the rim part in an area above the indication plate.

4. The meter device according to claim 2, wherein the indication plate frame includes a plurality of the projecting scale sections, and a size of a projecting scale section that is arranged at a position corresponding to a reference value of the measured amount is greater than sizes of the remaining projecting scale sections.

5. The meter device according to claim 2, wherein the projecting scale section includes:
a scale section inner end arranged on a rim part side;
a scale section outer end arranged outward from the scale section inner end; and a scale section inclination portion arranged between the scale section inner end and the scale section outer end.

6. The meter device according to claim 5, wherein the scale section outer end is positioned more forward than the scale section inner end on the front side of the indication plate.

7. The meter device according to claim 1, wherein the finger is made of a light guiding material and arranged to guide light from the light source or another light source, and the light from the light source or another light source is guided by the indication plate frame, and not through the indication plate, to reach the finger.

8. The meter device according to claim 1 further comprising:

an outer frame surrounding at least a portion outside of the indication plate frame, wherein the outer frame is treated to reflect light.

9. A vehicle comprising the meter device of claim 1.

10. The vehicle according to claim 9, wherein the meter device is juxtaposed with a second meter device, and the second meter device does not include an indication plate frame.

* * * * *